United States Patent
Chamberlain et al.

(10) Patent No.: US 7,802,069 B2
(45) Date of Patent: Sep. 21, 2010

(54) METHOD AND APPARATUS FOR PROTECTING FLASH MEMORY

(75) Inventors: Mark Chamberlain, Honeoye Falls, NY (US); Igor A. Spivak, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 862 days.

(21) Appl. No.: 11/714,987

(22) Filed: Mar. 7, 2007

(65) Prior Publication Data

US 2008/0222347 A1    Sep. 11, 2008

(51) Int. Cl.
*G06F 12/14* (2006.01)
(52) U.S. Cl. .................. 711/163; 711/103
(58) Field of Classification Search .......... None
See application file for complete search history.

(56) References Cited

U.S. PATENT DOCUMENTS

| | | | |
|---|---|---|---|
| 5,844,986 A | 12/1998 | Davis | |
| 5,883,956 A * | 3/1999 | Le et al. | 713/170 |
| 6,188,602 B1 | 2/2001 | Alexander | |
| 2003/0037246 A1 | 2/2003 | Goodman | |
| 2006/0036853 A1* | 2/2006 | Chen et al. | 713/161 |
| 2006/0143600 A1 | 6/2006 | Cottrell | |

FOREIGN PATENT DOCUMENTS

WO    98/00846    1/1998

* cited by examiner

*Primary Examiner*—Denise Tran
(74) *Attorney, Agent, or Firm*—Harness, Dickey & Pierce, PLC

(57) ABSTRACT

A method is provided for protecting flash memory residing on a computing device. The method includes: receiving a data file having a digital signature at a main processor; forwarding the data file from the main processor to a secondary processor for signature validation; validating the digital signature associated with the data file at the secondary processor; enabling a write capability of a flash memory upon successful validation of the digital signature; and writing the data file to the flash memory.

19 Claims, 3 Drawing Sheets

METHOD AND APPARATUS FOR PROTECTING FLASH MEMORY

FIELD

The present disclosure relates to a technique for protecting flash memory.

BACKGROUND

Flash memory is a form of non-volatile computer memory that is often embedded in modern computing devices. One common use of flash memory is to store the executable files needed to operate the computing device. The executable files are loaded into flash memory at the factory. Once deployed, it may be desirable to update the executable files or otherwise reprogram the flash memory. Therefore, flash memory is configured to be reprogrammed. As a result, flash memory is also prone to malicious attacks which may compromise the files stored therein and/or the operation of the computing device.

Therefore, it is desirable to provide a technique for protecting flash memory from such malicious attacks.

The statements in this section merely provide background information related to the present disclosure and may not constitute prior art.

SUMMARY

A method is provided for protecting flash memory residing on a computing device. The method includes: receiving a data file having a digital signature at a main processor; forwarding the data file from the main processor to a secondary processor for signature validation; validating the digital signature associated with the data file at the secondary processor; enabling a write capability of a flash memory upon successful validation of the digital signature; and writing the data file to the flash memory.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
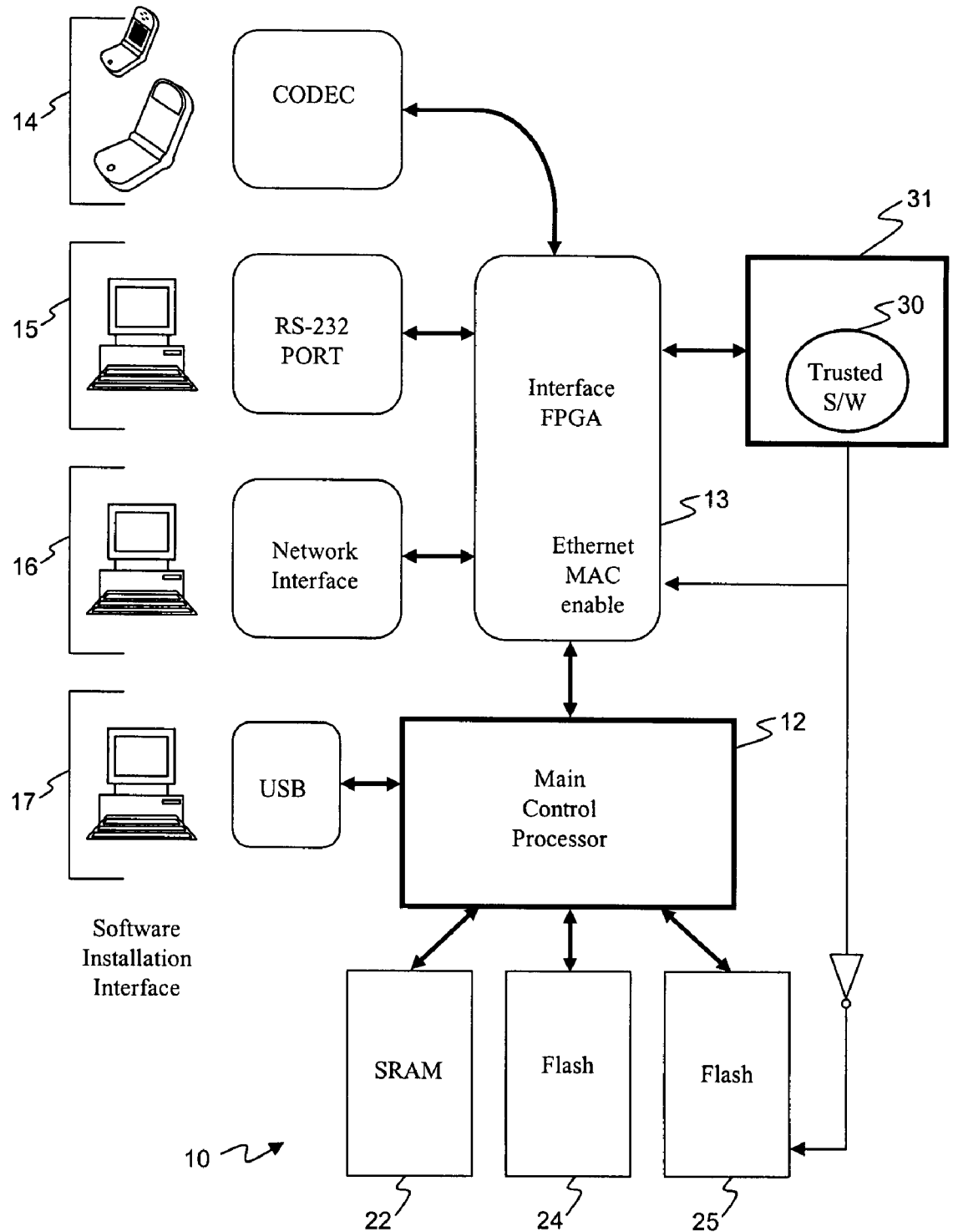
FIG. 1 is a block diagram depicting an exemplary computing device.

FIG. 1 depicts an exemplary computing device 10. The computing device 10 is comprised generally of a main control processor 12, various memory devices as well as various interface ports. The interface ports may include an audio interface 14, a serial port 15, a network interface port 16 and a Universal System Bus (USB) port 17. It is envisioned that the computing device may be equipped with other types of interface ports. The computing device 10 may optionally include a field programmable gate array 13 interposed between some of the interface ports and the main control processor 12.

Exemplary memory devices may include a static random access memory 22 and two or more flash memories 24, 25. One of the flash memories 24 is intended for storing configuration data and thus may be frequently updated by the main control processor 12; whereas, the other flash memory 25 is intended to store executable files and other data which rarely needs to be updated (e.g., only during software installation/upgrades). In this case, a write protect capability of the flash memory 25 is initially enabled after the executable files have been initially onto the memory. The computing device may be configured with other types of memory devices. While the following description is provided with reference to a particular hardware configuration, it is readily understood the other hardware configurations are within the scope of this disclosure.

In this exemplary embodiment, the computing device is further equipped with at least one trusted software component 30 executing on a secondary processor 31 which is distinct from the main control processor 12. Although the term trusted is generally understood, there is not a definitive meaning for this term. In this disclosure, the trusted software component cannot be addressed or otherwise accessible from outside of the computing device. The trusted software component may also be certified by a third party in accordance with some security standard, such as National Information Assurance Partnership (NIAP) Common criteria Evaluation and Validation.

In operation, the main control processor 12 is configured to write to any of the three memory devices. However, the flash memory 25 may be write protected as noted above. To provide a more secure computing environment, the trusted software component is responsible for enabling and disabling the write capability of the flash memory. Separating this function away from the main control processor makes it less prone to a malicious attack. Moreover, entrusting the enable/disable function to a trusted software component further minimizes the probability that this function may become compromised by a malicious attack. For a more secure configuration, the computing device may be equipped with an operator actuated switch. The operator must also place the switch into a LOAD state before files can be loaded into the flash memory 25.

Figure 2:
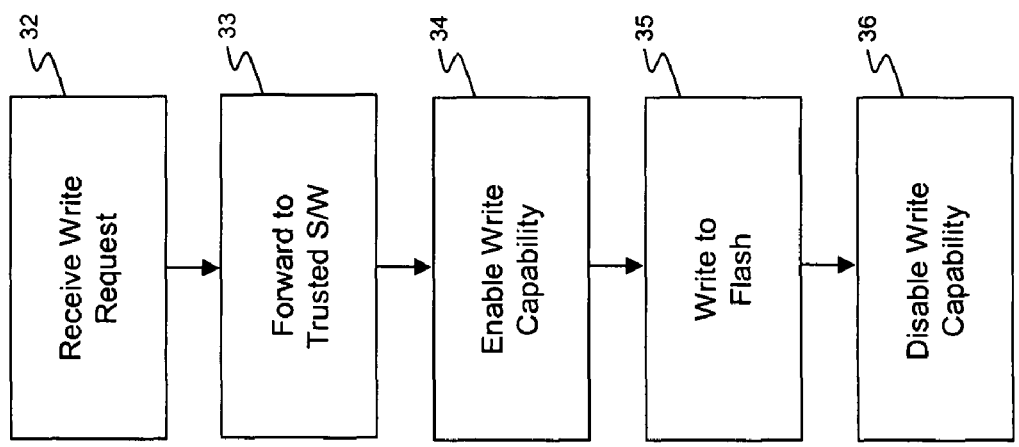
FIG. 2 is a flow chart illustrating an exemplary technique for writing to flash memory.
Figure 3:
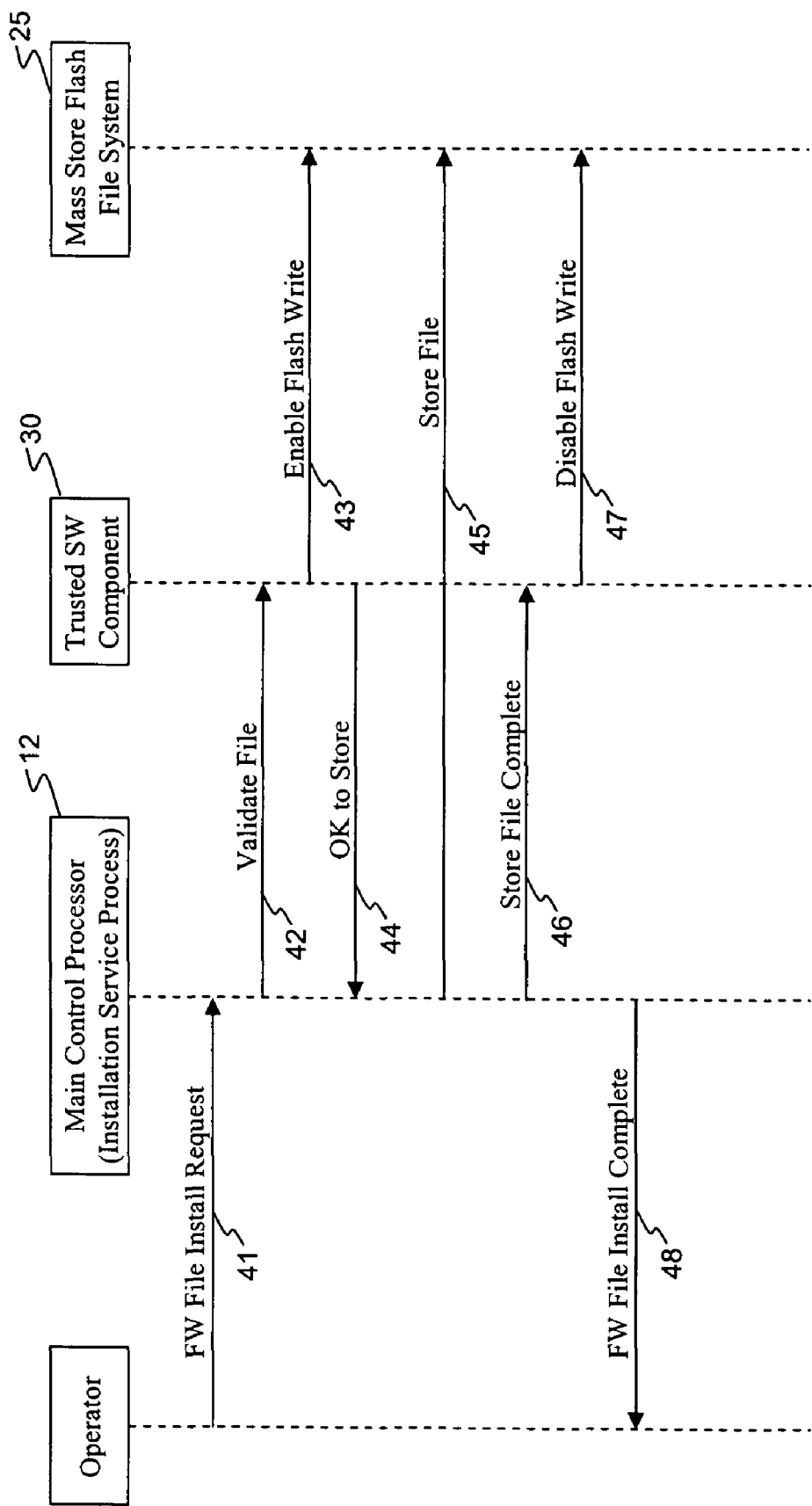
FIG. 3 is a timing sequence diagram illustrating another exemplary technique for writing to flash memory.

FIG. 2 illustrates an exemplary technique for writing to flash memory which employs the architecture described above. A request to write to the flash memory is received 32 at the main control processor. The write protect function for the flash memory is assumed to be enabled, thereby preventing the main control processor from writing to the memory device.

To disable the write protect function, the write request is sent 33 by the main control processor to the trusted software component. Upon receipt of the write request, the trusted software component enables 34 the write capability of the flash memory. To do so, the trusted software component may send a write enable signal to a write protect pin of the flash memory. The main control processor is now able to write 35 data to the flash memory.

After the main control processor has updated the flash memory, it notifies the trusted software component that the write request is complete. In response to this notice, the trusted software component disables 36 the write capability of the flash memory, thereby returning it to write protect mode. In particular, the trusted software component sends a disable signal to the write protect pin of the flash memory. In this way, the trusted software component controls access to the flash memory.

This technique might be used to update the executable files needed to operate the computing device. The executable files are initially loaded into flash memory (at the factory) prior to the device being deployed in the field. Once deployed, it may be desirable to update the executable files residing in flash memory. In this example, the computing device is further defined as a software defined radio, such that the executable files for operating the radio are loaded into flash memory. It is understood that the technique described below is applicable to other types of computing devices.

To authenticate the source and/or content of an executable file, each executable file which is to be loaded into flash memory includes a digital signature. In one exemplary embodiment, the digital signature is a hash value for the executable file which has been encrypted with the use of a private key. The digital signature may be derived in accordance with the Digital Signature Standard (DDS). However, other types of digital signature schemes (e.g., message authentication codes) are contemplated by this disclosure. Moreover, it is envisioned that other types of authentication procedures may also be used within the broader aspects of this disclosure.

In a software installation mode, the main control processor is configured to receive 41 data files which are to be loaded into flash memory. The main control processor in turn forwards 42 the data files (or a copy thereof) to the trusted software component for signature validation. In this exemplary embodiment, the trusted software component is a cryptographic engine which provides encryption and decryption functionality. Exemplary cryptographic engines include the CITADEL cryptographic engine and the Sierra II programmable cryptographic module which are available from Harris Corporation.

The cryptographic engine authenticates the data file(s) sent by the main control processor. For instance, the cryptographic engine validates the digital signature associated with the data file. In the case of the digital signature described above, a corresponding public key is used to decrypt the hash value which is then used to authenticate the data file. If authentication fails, the cryptographic engine notifies the main control processor which in turn purges the data file, thereby maintaining the integrity of the flash memory. It is also envisioned that the data file itself may be encrypted in which case the cryptographic engine may also need to decrypt the data file.

On the other hand, the cryptographic engine will enable 43 the write capability of the flash memory when authentication is successful. In addition, the cryptographic engine will alert 44 the main control processor as to the successful authentication verification so that the data files may be written 45 to the flash memory by the main control processor. Alternatively, the cryptographic engine may be configured to write the data file to flash memory once it is write enabled. In either case, the cryptographic engine will disable 47 the write capability of the flash memory once the data file has been written into the memory.

Computing devices are most susceptible to attacks from data received from an external network interface (e.g., IP data from the Internet). To further secure the software installation process, the trusted software component may be operable to disable a network interface while the Flash memory is write enabled. To do so, the trusted software component may disable a software-defined interface port for IP traffic (as shown in FIG. 1) or an applicable hardware port. For instance, all Ethernet traffic may be disabled by means of removing the clock from the Ethernet circuits. Other disablement techniques are contemplated. By disabling the IP interface, the computing device is less susceptible to attacks during the time the flash memory is write enabled.

The above description is merely exemplary in nature and is not intended to limit the present disclosure, application, or uses.

What is claimed is:

1. A method for protecting flash memory residing on a computing device, comprising:
    receiving a write request for the flash memory at a first processor;
    enabling, upon receipt of the write request, a write capability of the flash memory with a trusted software component executing on a second processor which is distinct from and not interconnected via a computer bus to the first processor;
    writing data to the flash memory;
    disabling an external network interface to the computer device during the time in which the flash memory is write enabled; and
    disabling the write capability of the flash memory after the data is written to the flash memory.

2. The method of claim 1 further comprises receiving a data file having a digital signature with the write request.

3. The method of claim 2 further comprises forwarding the data file from the first processor to the second processor for signature validation; and validating the digital signature associated with the data file at the second processor.

4. The method of claim 3 further comprises enabling a write capability of a flash memory upon successful validation of the digital signature.

5. The method of claim 1 wherein the trusted software component is a cryptographic engine operating on the secondary processor.

6. The method of claim 3 further comprises transmitting a message indicative of a successful validation from the second processor to the first processor and writing the data file from the first processor to the flash memory.

7. A method for protecting flash memory residing on a computing device, comprising:
    receiving a data file having a digital signature at a main processor;
    forwarding the data file from the main processor to a secondary processor for signature validation, where the second processor is distinct from the main processor;
    validating the digital signature associated with the data file at the secondary processor;
    enabling a write capability of a flash memory upon successful validation of the digital signature;
    preventing receipt of data packets which are transmitted in accordance with an Internet Protocol via a network interface to the computing device during the time in which the flash memory is write enabled; and
    writing the data file to the flash memory.

8. The method of claim 7 further comprises disabling the write capability of the flash memory after writing the data file to the flash memory.

9. The method of claim 7 wherein disabling a write capability comprises sending a write disable signal from the secondary processor to a write protect pin of the flash memory.

10. The method of claim 7 further comprises validating the digital signature using a cryptographic engine operating on the secondary processor.

11. The method of claim 7 wherein enabling a write capability comprises sending a write enable signal from the secondary processor to a write protect pin of the flash memory 12. The method of claim 7 further comprises preventing receipt of data packets by disabling a clock of the network interface by the secondary processor.

13. The method of claim 7 further comprises receiving a message indicative of a successful validation from the secondary processor and writing the data file from the main processor to the flash memory.

14. A system for protecting flash memory on a computing device, comprising:

a flash memory having a write protect pin;

a main control processor adapted to receive a data file having a digital signature and operable to forward the data file to a secondary processor for signature validation, the secondary processor being physically distinct from and not interconnected via a computer bus to the main control processor; and the secondary processor adapted to receive the data file from the main control processor and operable to validate the digital signature associated with the data file, the secondary processor further operable to send a write enable signal to the write protect pin upon successful validation of the digital signature and to disable a network interface to the computer device during the time in which the flash memory is write enabled.

15. The system of claim 14 wherein the main control processor is operable to write the data file to the flash memory once write enabled by the secondary processor.

16. The system of claim 14 wherein the secondary processor is operable to write the data file to the flash memory once write enabled.

17. The system of claim 14 wherein the secondary processor is operable to send a write disable signal to the write protect pin once the data file has been written to the flash memory.

18. The system of claim 14 wherein the secondary processor is further defined as a cryptographic engine.

19. The system of claim 14 wherein the secondary processor is operable to disable a clock of an Ethernet interface transceiver.

\* \* \* \* \*